United States Patent [19]

Garbagnati

[11] Patent Number: 5,036,969
[45] Date of Patent: Aug. 6, 1991

[54] CHAIN CONVEYOR

[75] Inventor: Carlo Garbagnati, Latina, Italy

[73] Assignee: Regina Sud S.p.A., Latina, Italy

[21] Appl. No.: 577,048

[22] Filed: Aug. 31, 1990036969331002198690.1

[51] Int. Cl.⁵ .............................................. B65G 15/60
[52] U.S. Cl. ................................... 198/805; 198/690.1
[58] Field of Search ....................... 198/805, 690.1, 831

[56] References Cited

U.S. PATENT DOCUMENTS

| | | | |
|---|---|---|---|
| 3,980,173 | 9/1976 | Riggs | 198/339.1 |
| 4,643,298 | 2/1987 | Wallaart | 198/805 |
| 4,742,906 | 5/1988 | Wallaart | 198/805 |
| 4,805,764 | 2/1989 | Van Zijderveld, Jr. | 198/805 |
| 4,823,393 | 4/1989 | Langhans et al. | 198/805 |
| 4,892,186 | 1/1990 | Frei | 198/805 X |

FOREIGN PATENT DOCUMENTS 1115252 5/1968 United Kingdom .
2037690 12/1982 United Kingdom ................ 198/805

*Primary Examiner*—Robert P. Olszewski
*Assistant Examiner*—Cheryl L. Gastineau
*Attorney, Agent, or Firm*—Stevens, Davis, Miller & Mosher

[57] ABSTRACT

Chain conveyor in which a chain with flat conveying surface slides on guides with which there are associated magnets that retain the chain against the slip faces of the guides. Between these faces is a channel-shaped gap of which at least the sides consist of inserted elements which close seats in the guide which house the magnets.

4 Claims, 2 Drawing Sheets

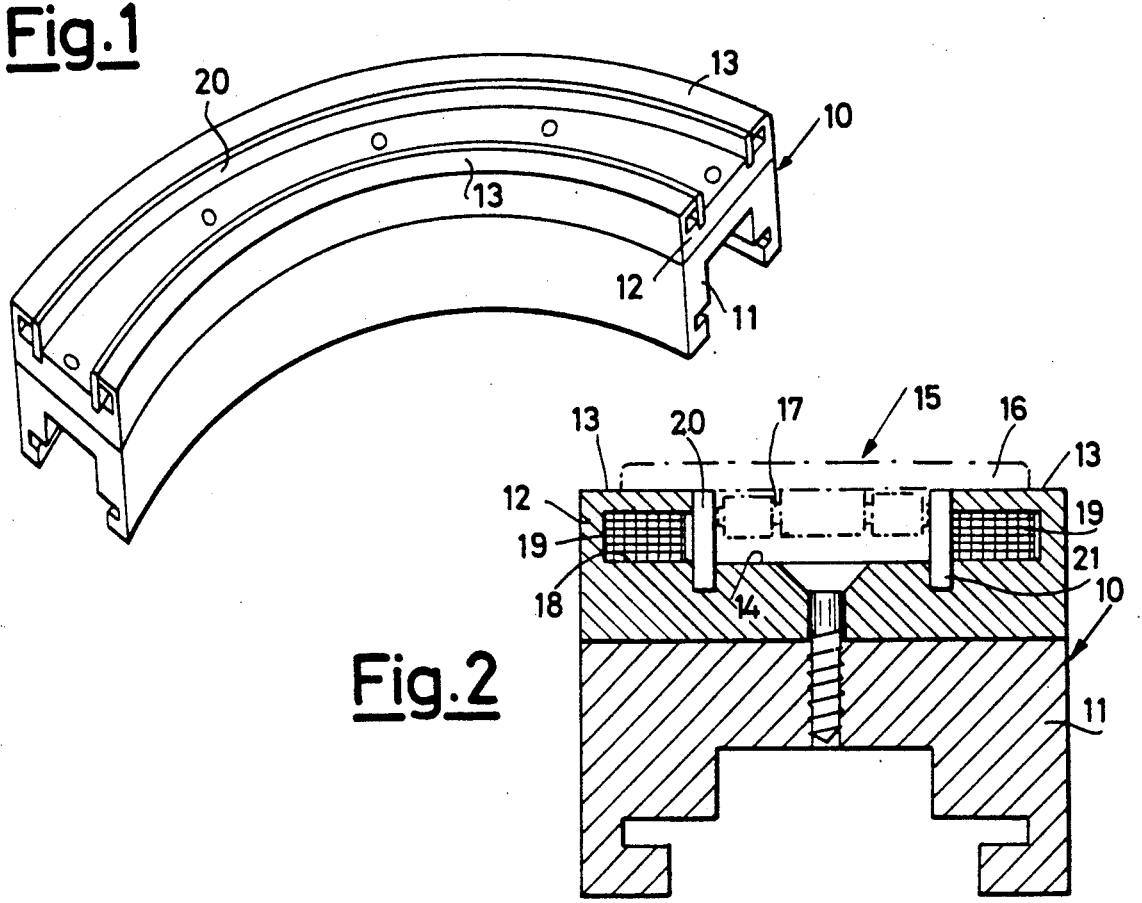
Fig.1
Fig.2
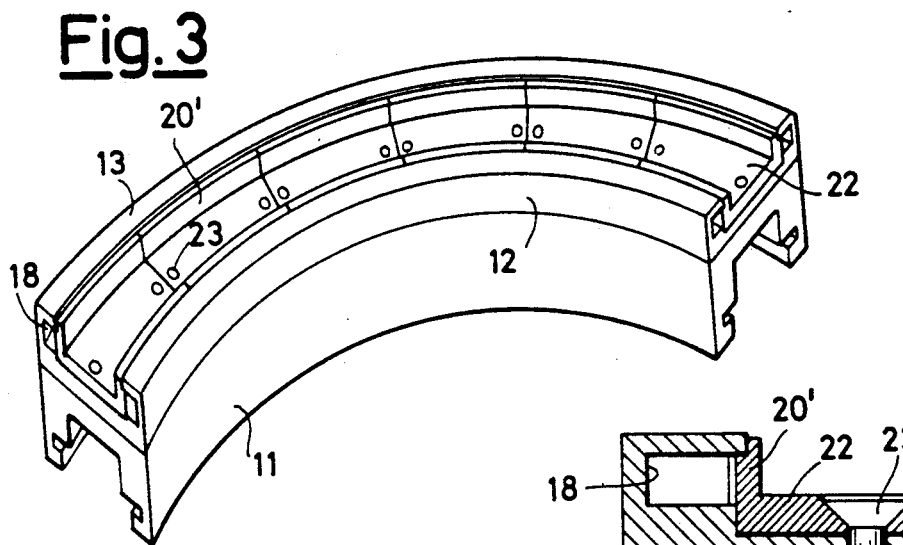
Fig.3
Fig.4

CHAIN CONVEYOR

This application is a continuation of application Ser. No. 298,757, filed Jan. 19, 1989, abandoned.

Chain conveyors have long been known in which a chain having flat conveying surface slides on guides with which there associated magnets that retain the links of the chain against the slip faces of the guide.

Examples of conveyors of this type are for instance shown in U.S. Pat. No. 3,980,173 and British patent 1,115,252.

A not negligible technical problem occurring in the manufacture of these conveyors is the need for a rational construction of the guides which will house the permanent magnets that set up the magnetic field applied to the chain to keep it held to the guide.

It is necessary for the magnets to be efficiently retained below the slide surfaces of the chain; it is also necessary for the construction of the guides to be economical, and for the chain slide surfaces to be made of material highly resistant to stress and wear.

The object of the present invention is a guide structure that allows manufacture of an extremely efficient and dependable product which is nonetheless straightforward to manufacture and service.

To achieve this object the invention embodies a conveyor comprising a link chain featuring flat elements made of ferromagnetic material joined centrally by articulation members, and a guide having an upper profile with two flat faces on which the flat elements of the chain slide in the proximity of magnets housed in the guide, provision being made between the said surface for a central channel in which the central articulation members of the chain move and on the sides of which rest complementary projections of the chain for the lateral guidance thereof, wherein the seats in the guides housing the magnets are open on the side facing the central channel of the guide in which there are fixed closure elements forming the sides of the said central channel.

The objects and characteristics of the invention will become more apparent from the following description of exemplifying forms of embodiment with reference to the appended drawings, in which:

FIG. 1 is a perspective view of a section of guide embodied in accordance with the invention;

FIG. 2 is a cross section of the guide of FIG. 1;

FIGS. 3 and 4 are a perspective view and a cross section view of a second form of embodiment of the invention;

Figure 5:
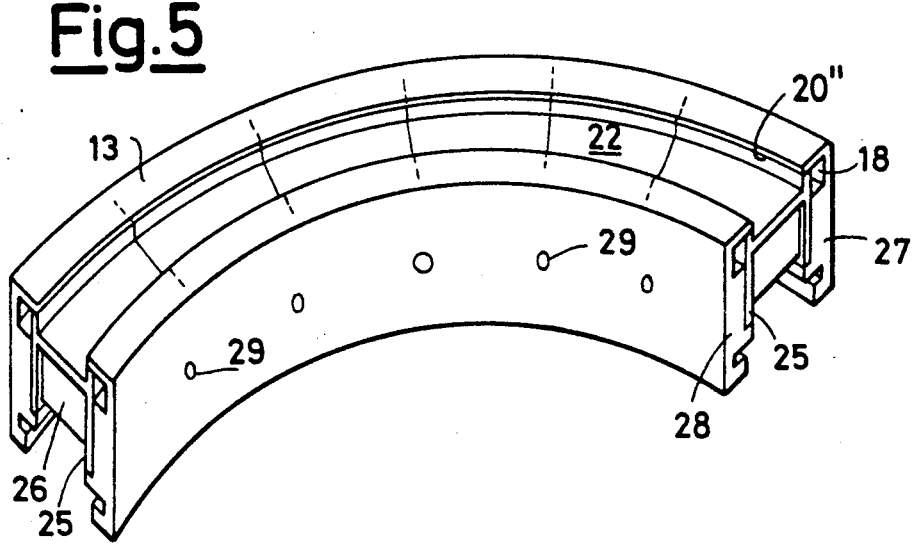
FIG. 5 is a perspective view of a third form of embodiment of the invention.

With reference to FIGS. 1 and 2, a guide for a flat conveyor chain is indicated overall by 10; in the example of embodiment illustrated the guide provides for a lower part 11 and an upper part 12, which are in any case interconnected: the embodiment in separate parts simplifies the construction of the guide and allows the best choice of materials for the single parts, in view also of the mechanical stresses and wear undergone in use.

The upper part of the guide presents two faces 13, between which there is a channel-shaped area 14; on the guide runs a chain 15 shown by dots and dashes, per se known, in which use is made of link with flat elements 16 connected by articulations 17 which permits the links to move reciprocally so as to adapt to the different paths followed by the guides. The articulations 17 move within the channel 14, while the flat elements 16 move supported on the slip faces 13. The projection represented by the articulations 17, optionally provided with suitable slide surface, is guided against lateral deviations by the channel 14, in this way determining the trim of the chain on the guide.

According to the invention, hollows 18 are formed in the part 12 of the guide; these are intended to accept magnets 19 positioned immediately below the slip faces 13 and thus exert a force of attraction on the chain elements 16, keeping them held to the guide 10.

These hollows are open towards the inner face of the channel 14, and are closed by inserted elements 20.

The elements 20 thus come to form the sides of the channel 14, against which sides the chain links 15 slide and are in this way guided against lateral deviations. In the form of embodiment now described, the elements 20 are kept in position by being partially fixed, proximally to one of their edges 21, within the body of the guide; they can, however, be fixed in any known manner.

The structure described above enables the seats holding the magnets 19 to be closed after these have been placed within them, and also allows formation of the sides of the channel 14—which are subjected to a high degree of wear due to the sliding on them of the chain made of any suitable material including high-quality material—without the need to make the entire guide body out of the same material.

The elements that make up the sides of the central channel and which at the same time close the seats holding the magnets can also extended beyond the portion of them that forms the sides of the central channel. An example of this form of embodiment is illustrated in FIGS. 3 and 4, in which corresponding parts are indicated by the same reference numerals as in FIGS. 1 and 2. In this form of embodiment the elements 20' that close the seats 18 are interconnected by a flat fascia 22, thus taking on an overall U-shaped configuration. This permits the elements 20' to be held in place, for example by using the same fixing member 23 that connects the parts 11 and 12 of the guide. It should be noted that the edges 24 of the elements 20' can be fixed to the extreme edges of the slip faces 13, so proving a cooperation between the parts that augments the rigidity of the whole.

Figure 6:
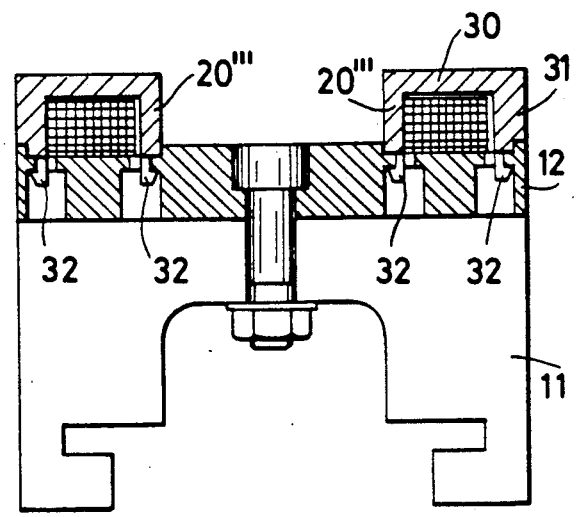
FIG. 6 is a cross section of a fourth form of embodiment of the invention.

As is shown in FIG. 5, beyond the connecting fascia 22, the elements 20" also extend as walls 25, to form a substantially H-shaped section; provision is made between these walls for spaced plates 26 to impart sufficient rigidity to the walls. In consequence, instead of being divided into an upper part and a lower part, the guide comes to consists of two facing secular lateral elements 27 and 28, braced by interposition of the central body demarcated by the walls 25. The different parts can be restrained by transversal tie-rods 29. The lateral walls 20" can extend to form other walls for the seats holding the magnets; in particular, the magnets must in every case rest directly on the guide body, which must thus constitute at least one of the walls of the seats holding them. FIG. 6 shows how the magnet-containing wall 20''' extends as an upper part 30, which comes to form a slip or slide element for the chain that is functionally comparable to the wall 13 in FIG. 2. The wall 30 extends further to form a wall 31. The walls 20''' and 31 will be restrained, preferably with their free edges, to the guide body 12; FIG. 6 illustrates how this restraint can be effected by means of latchingly engage hook restraints 32.

Figure 7:
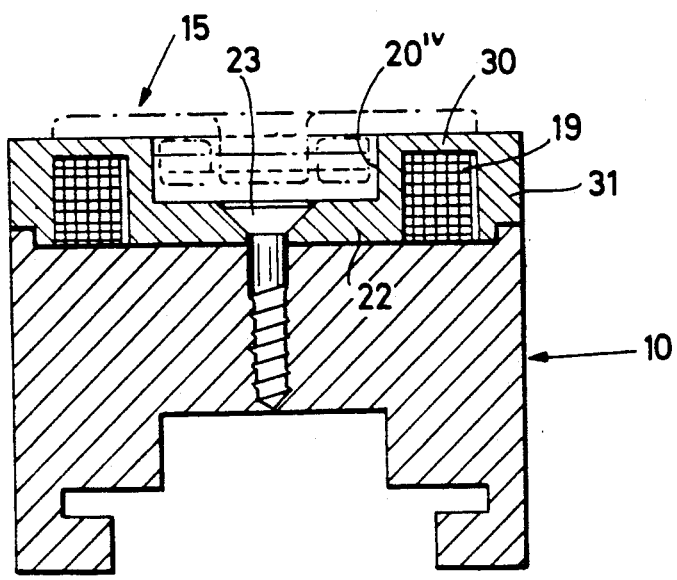
FIG. 7 is a view similar to the one shown in FIG. 4, but for a different form of embodiment of the invention.

If the walls 20''' are connected by a central fascia, provision can also be made for an extension of them to enclose the magnets, as indicated in the embodiment of FIG. 4; in such case the closure element for the seats of the magnets can be represented substantially by the entire upper part of the guide. Such a form of embodiment is illustrated in FIG. 7: the walls 20''' are joined by a fascia 22 and extend also as walls 30 and 31 which define the seats of the magnets 19.

I claim:

1. Chain conveyor comprising a guide for said chain defining a central guide channel with a bottom and sides, said sides defining flat surfaces on top and spaced pockets located in said sides accessible from said channel; magnets positioned within said pockets; closure elements made of material highly resistant to stress and wear positioned on said sides to act as a closure for said pockets and to act as a liner for the sides of said channel, and a chain having a plurality of links including flat elements of ferromagnetic material joined end to end by articulation members, said links having projections fitting into said channel and guided thereby, said flat elements being slidable on the flat top surfaces of said sides.

2. Conveyor as described in claim 1, wherein the closure elements are fixed in the guide.

3. Conveyor as described in claim 1, wherein the two closure elements forming the sides of the central channel are joined by a flat fascia which forms the bottom of the channel.

4. Conveyor as described in claim 3, wherein the closure elements forming the sides of the channel extend downwards in the form of walls to which lateral bodies forming the guide are restrained.

* * * * *